April 12, 1955

G. H. RUFLE 2,706,096

FISHING REEL

Filed July 1, 1954

INVENTOR.
GEORGE H. RUFLE
BY
Robert E Burns
ATTORNEY

April 12, 1955     G. H. RUFLE     2,706,096
FISHING REEL

Filed July 1, 1954     5 Sheets-Sheet 2

INVENTOR.
GEORGE H. RUFLE
BY
*Robert E. Burns*
ATTORNEY

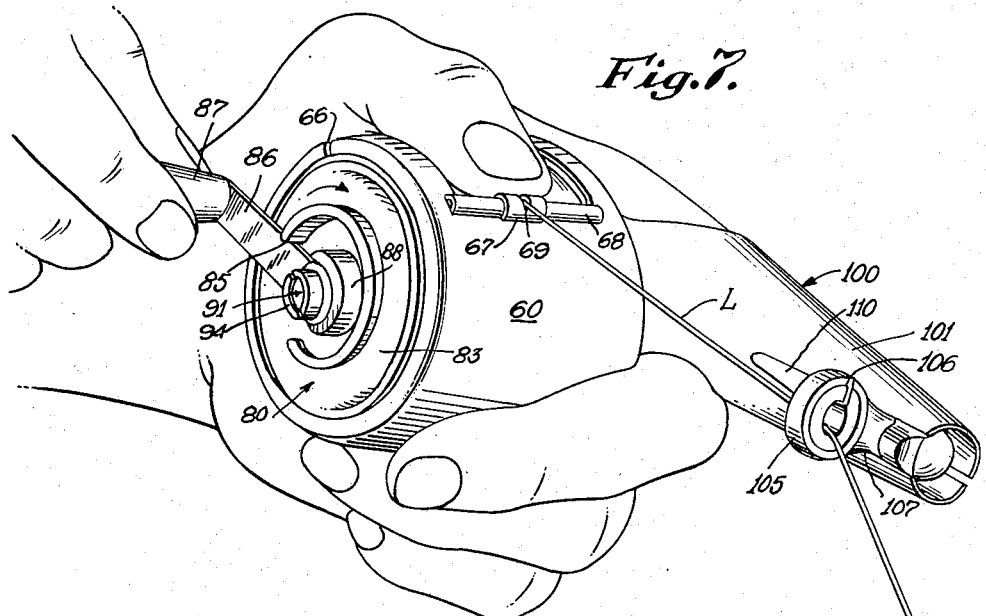
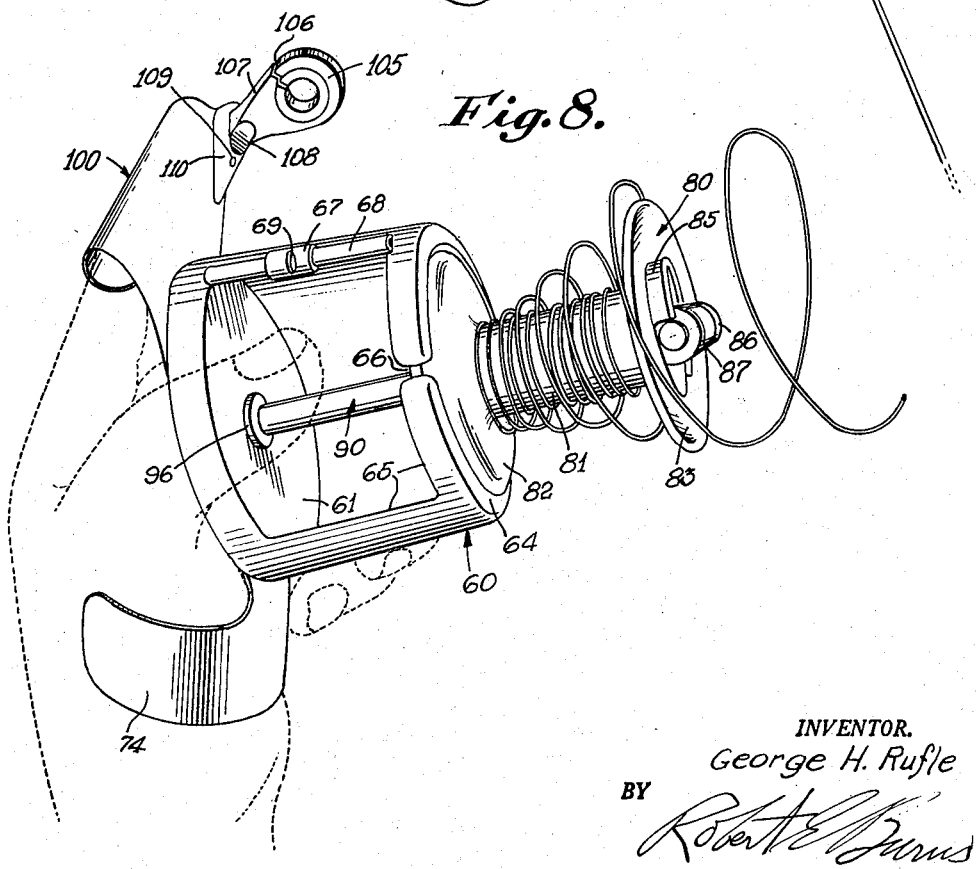

April 12, 1955
G. H. RUFLE
2,706,096
FISHING REEL
Filed July 1, 1954
5 Sheets-Sheet 4
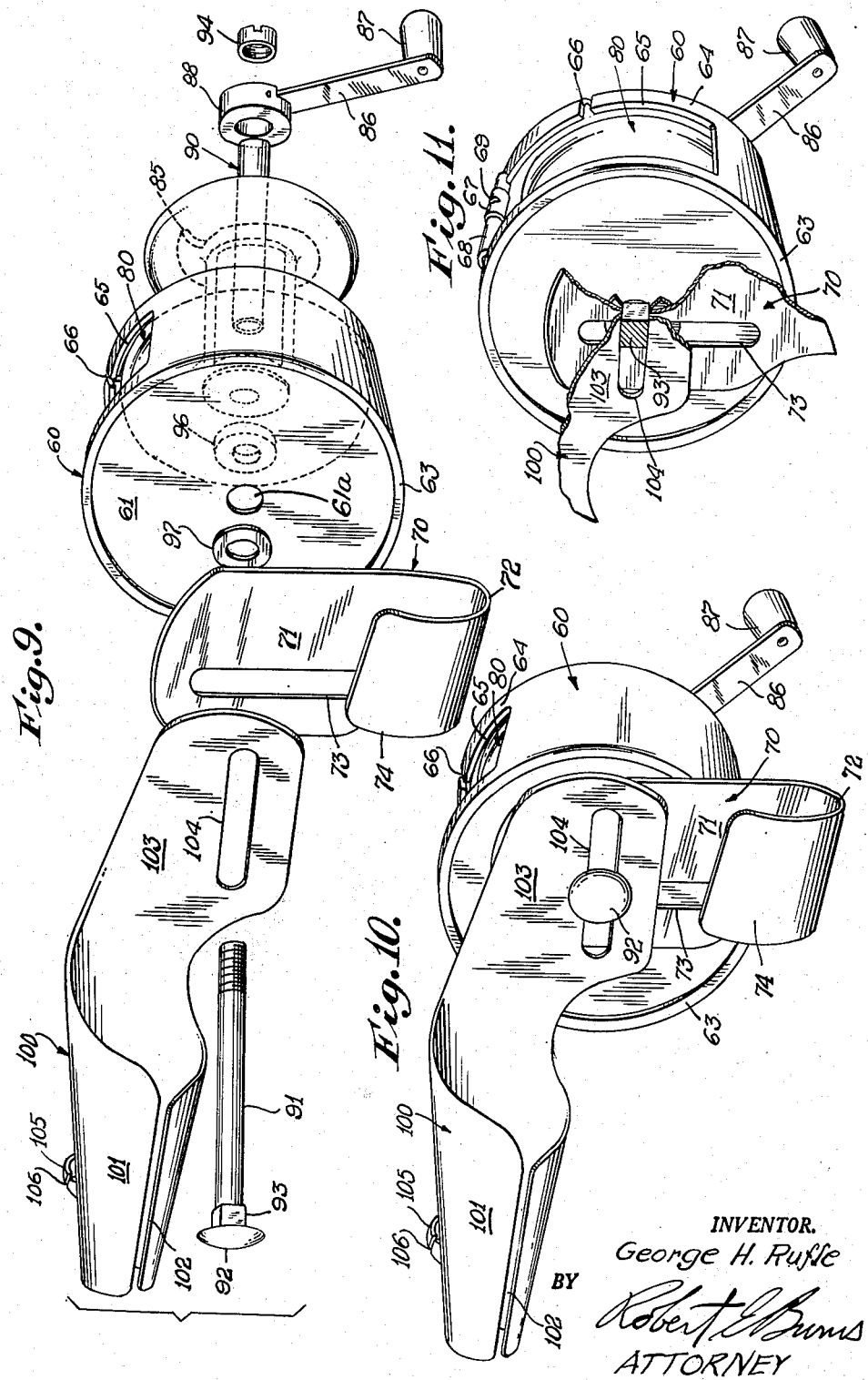
INVENTOR.
George H. Rufle
BY
Robert E Burns
ATTORNEY April 12, 1955
G. H. RUFLE
FISHING REEL
2,706,096
Filed July 1, 1954
5 Sheets-Sheet 5
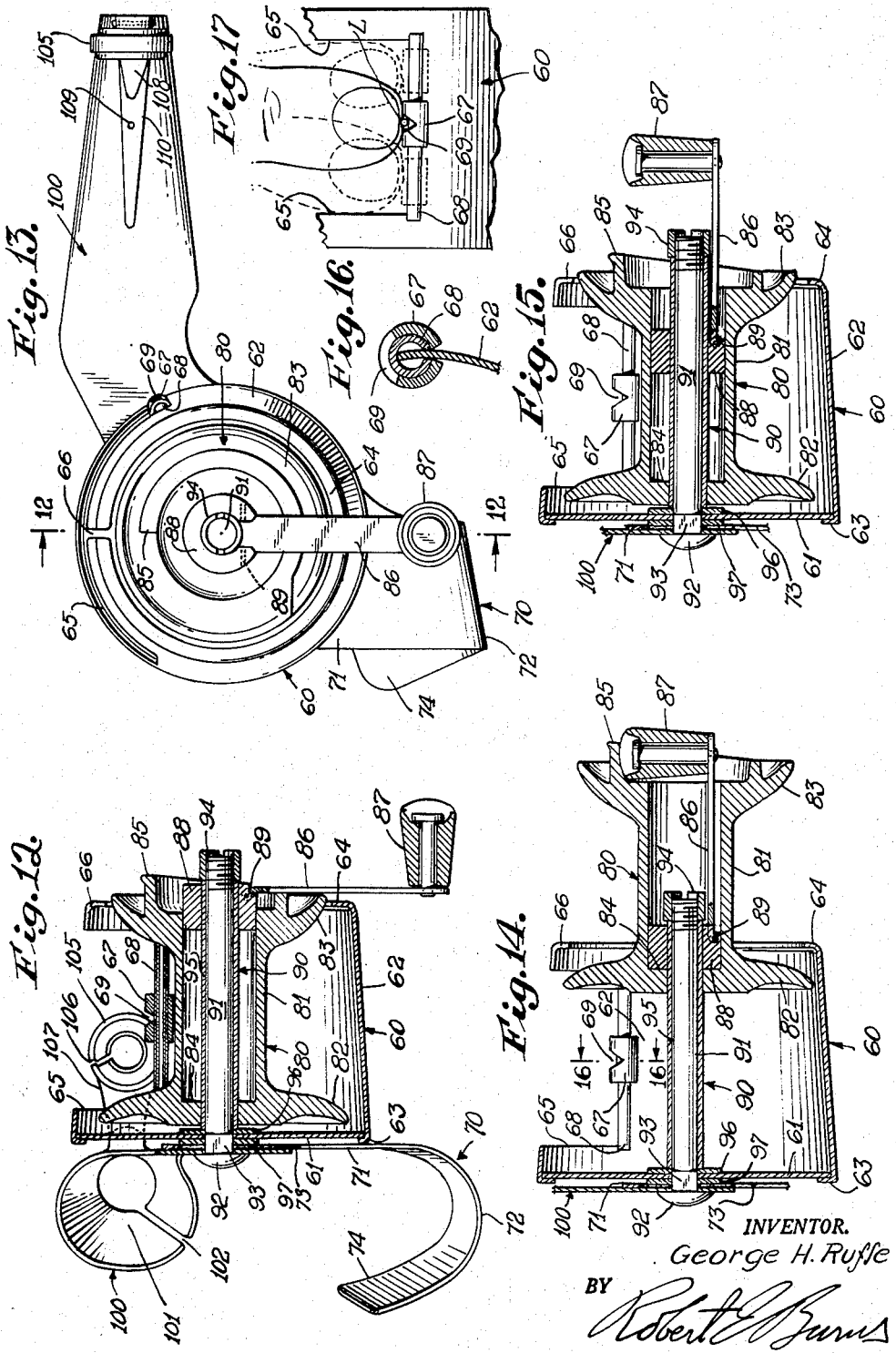
INVENTOR.
George H. Rufle
BY
Robert E. Burns
ATTORNEY United States Patent Office 2,706,096
Patented Apr. 12, 1955

2,706,096

FISHING REEL

George H. Rufle, Laurelton, N. Y., assignor to Handi-Fisher Corporation, New York, N. Y., a corporation Application July 1, 1954, Serial No. 440,595

12 Claims. (Cl. 242—97)

The present invention relates to reels which are particularly suitable for use in fishing and are herein referred to as fishing reels although they may also be used for other purposes.

This application is a continuation-in-part of my application Serial No. 282,850, filed April 17, 1952, now abandoned.

It is an object of the invention to provide a reel that can conveniently be held in the hand and used for dropline fishing or casting without the conventional fishing rod. The reel in accordance with the invention comprises a shell or casing, a spool rotatable in the shell or casing and adapted to receive a fishing line and a finger stall that projects forwardly from the shell or casing in a position to receive the user's forefinger when the reel is held in the hand. The finger stall carries a guide eye which receives and guides the fishing line wound on the spool and provides, in effect, a short fishing pole and a sensitive "feeler" to detect any bites. The shell or casing is preferably provided with securing means which cooperates with the finger stall in holding the reel on the user's hand so that it can be held without effort. Provision is made for adjustment to fit hands of different sizes.

The reel is not only convenient to use but is also convenient to carry as it fits easily into a pocket or the glove compartment of a car. It can hence always be kept available for use whenever the opportunity presents itself. In contrast with much of the fishing tackle now available, the reel in accordance with the invention is inexpensive to manufacture. It is easily made and readily assembled and disassembled.

While the improved reel in accordance with the invention is especially useful for fishing, it can be used for other purposes, as for a line used in flying a kite or a model airplane.

Other objects and advantages of the invention will appear from the following description and claims in conjunction with the accompanying drawings which illustrate preferred embodiments.

In the drawings:

Fig. 7 is a perspective view similar to Fig. 1 but showing a preferred embodiment.

Fig. 8 is a top perspective view showing the spool in an outward position so that the line is allowed to spin off the spool without rotation of the spool.

Fig. 9 is an exploded rear perspective view.

Fig. 10 is a perspective view from approximately the same direction as Fig. 9 but showing the parts assembled.

Fig. 11 is a perspective view similar to Fig. 10 with parts broken away and showing the shell rotated to another position.

Fig. 12 is an axial section taken approximately on the line 12—12 in Fig. 13.

Fig. 13 is an outer end elevation.

Fig. 14 is an axial section showing the spool in position for "spinning" the line off without rotation of the spool.

Fig. 15 is an axial section showing a handle for rotating the spool in "free-wheeling" position.

Fig. 16 is an enlarged fragmentary section on the line 16—16 in Fig. 14 showing a winding guide and tension control device.

Fig. 17 is a fragmentary front elevation illustrating the operation of the winding guide and tension control device.

Figure 1:
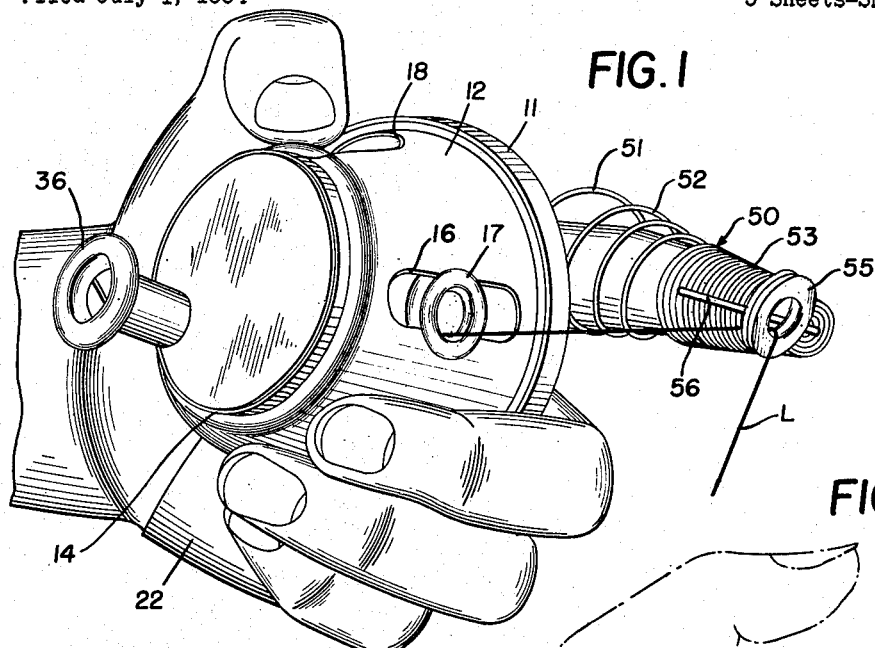
Fig. 1 is a perspective view of a reel in accordance with the invention, illustrating how the reel is held in the hand.

The embodiment of the invention shown in Figs. 1–6 of the drawings comprises a shell or casing 10 which is adapted to be held in the hand, as illustrated in Fig. 1, an adjustable clamp or bracket 20 which assists in holding the casing on the hand, a spool 30 that is rotatably mounted in the casing, a central shaft structure 40 which provides a bearing for the spool 30 and also secures the clamp to the casing and a finger stall or "feeler" 50 which fits on the forefinger and carries an eye through which the line L runs.

The shell or casing 10 comprises a circular base 11 and a cup-shaped case 12. The base has a central hole and a peripheral rim 13. The case 12 is generally frusto-conical with openings at both ends. At the smaller end, the opening is surrounded by a rim 14. At the larger end, there are provided means for securing the case 12 to the base 11. The connecting means shown in the drawing comprises interlocking portions 15 on the case 12 and the rim 13 of the base 11 adapted to be interengaged with one another by turning the case relative to the base in the manner of a bayonet joint. At the front side, the case 12 is provided with an elongated hole 16 in which a grommet or eye 17 is freely slidable. The upper side of the case 12 is provided with an approximately round hole 18 which extends at least substantially to the rim 14. The edges around the holes 16 and 18 are preferably thickened, to strengthen them and present a smooth, round edge.

The casing 10 is of such size and shape to be conveniently held on the hand, as illustrated in Fig. 1. The base 11 at the larger end of the casing rests against the palm of the hand. The casing is gripped between the second, third and fourth fingers and the heel of the thumb, leaving the thumb free for insertion into the hole 18 of the casing to brake the reel, as described below.

Figure 2:
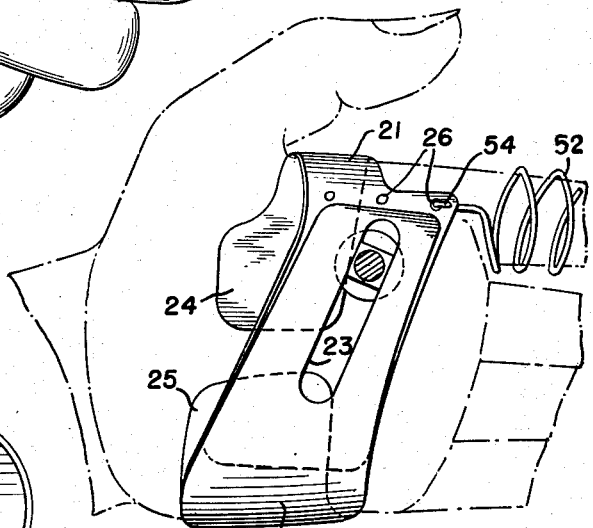
Fig. 2 is a view taken approximately on the line 2—2 in Fig. 3 and illustrating adjustable clamping means for holding the reel on the hand.
Figure 3:
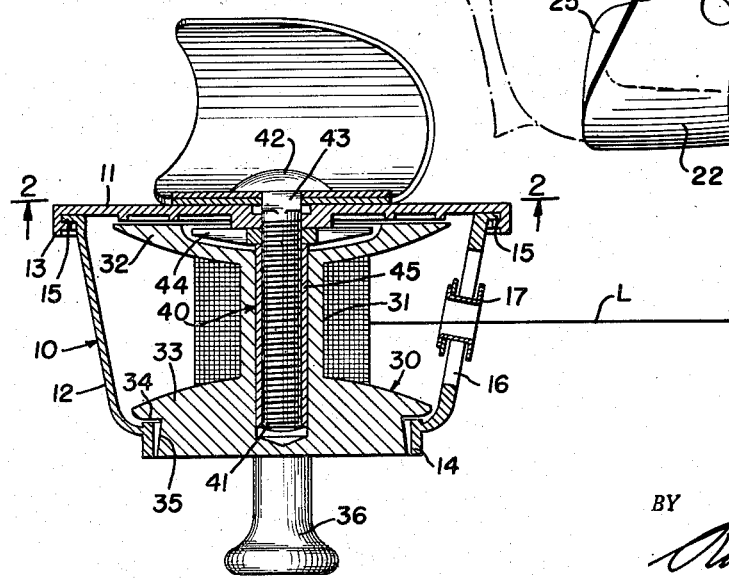
Fig. 3 is an axial horizontal section.
Figure 5:
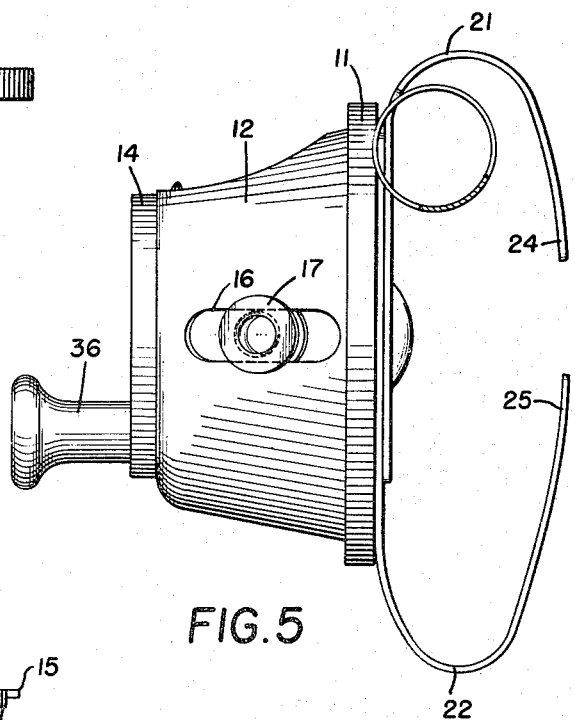
Fig. 5 is a front elevation with a portion of the finger guide cut away.

The bracket 20 comprises two hook-shaped portions 21 and 22 (Figs. 2 and 5). At its inner end, each of these hook-shaped members is provided with an elongated hole 23 which permits an adjustable mounting to accommodate hands of different size. The outer ends 24 and 25 are shaped to fit comfortably over the hand and engage the back of the hand. The members 21 and 22 are sufficiently springy to grip the hand snugly but without sufficient pressure to cause discomfort. One or more small holes 26 are preferably provided in the upper portion of the upper bracket member 21 for the purpose of attaching the finger stall 50 as described below.

Figure 4:
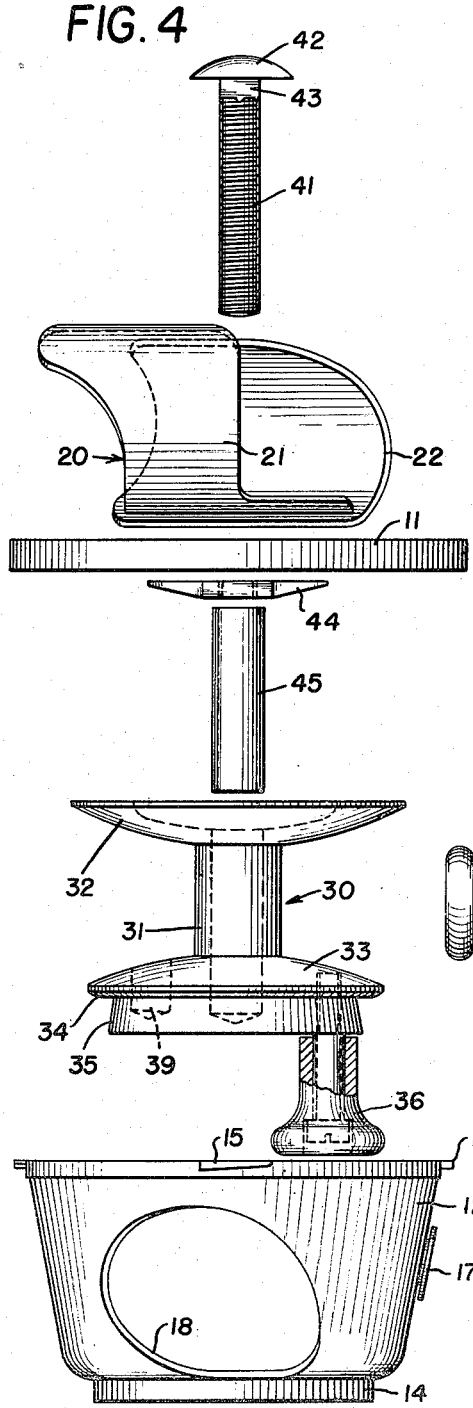
Fig. 4 is an exploded plan view, a portion of the handle for turning the reel being broken away to show internal construction.
Figure 6:
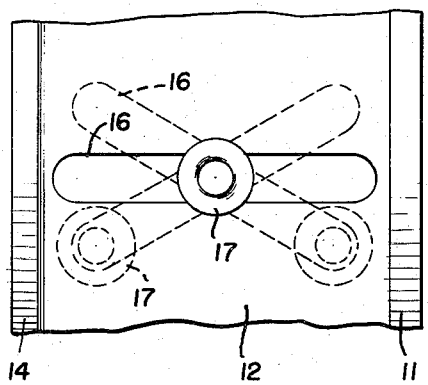
Fig. 6 is an enlargement of a portion of Fig. 5 showing schematically how a guiding eye slidable in an elongated slot is movable from side to side by tilting the reel so as to distribute the line on the reel when winding it up.

The spool 30 comprises a hollow spindle portion 31 and inner and outer end flanges 32 and 33. A peripheral notch in the outer edge of the end flange 33 provides an annular shoulder 34 and an axial bearing surface 35. A handle 36 is rotatably secured to the outer face of the outer end 33 of the spool by means of a screw or bolt 37 which is surrounded by a bushing 38 to permit the handle 36 to turn freely. The axis of the handle 36 is parallel, but spaced from, the axis of the spool so that the handle may be used as a crank to turn the spool. The weight of the handle 36 is preferably counterbalanced so that the spool can rotate smoothly. This may be done, for example, by drilling holes in the outer flange 33 on the same side as the handle 36 or by setting a weight 39 into the rim 33 on the opposite side, as illustrated in Fig. 4.

The shaft structure 40 serves the dual purpose of securing the bracket 20 on the base of the casing and providing a bearing for the rotating spool 30. It comprises a threaded bolt 41 having a carriage head 42 and a short square shank 43. The bolt 41 extends through the elongated holes 23 of the bracket members 21 and 22 and through the central hole of the base 11. A flat nut 44 screws onto the bolt and engages the inner face of the base 11 to hold the bracket members and the base together. It will be seen that, by loosening the nut 44, the bracket members can be adjusted to whatever position is desired. The nut 44 is then tightened to lock them in position. The square shank 43 of the bolt engages the edges of the holes 23 in the bracket members to hold the bolt against turning as the nut is tightened. The bolt 41 projects from the inner face of the base 11 a substantial distance beyond the nut 44 and is surrounded by a bushing 45 which is of such size as to fit snugly over the bolt and inside an axial bore provided in the spool 30.

The finger stall 50 is adapted to fit over the forefinger, as shown in Fig. 1. It consists of a finger-engaging portion formed of a spirally wound wire 51. Starting at the inner end, there are a number of convolutions 52 which are spaced from one another. At the outer end, there are a plurality of substantially continuous convolutions 53. The diameter of successive convolutions progressively decreases from the inner toward the outer end. Thus, the construction is such that the finger-engaging portion of the finger stall will fit a finger of any size. At its inner end, the wire 51 is bent to form a hook 54 (Fig. 2) adapted to hook into one or another of the holes 26 in the upper bracket member 21 to resiliently connect the finger stall to the bracket so as to hold the finger stall on the finger where the reel is held in the hand. The outer end of the wire is bent laterally and extends around an eye or grommet 55, the end being then brought back and secured to the finger-engaging portion, for example by extending inwardly as indicated at 56 and being soldered, brazed or welded to one or more of the convolutions 53.

The construction of the reel in accordance with the invention permits most of the parts to be made of non-critical material. Thus, the spool 30 and handle 36 may be made of wood or plastic while plastic is also suitable for the casing 10. The bracket or clamp members 21 and 22 are preferably formed of sheet metal but resilient plastic material can be used, if desired.

The ease with which the reel may be assembled is clearly seen from the exploded view in Fig. 4. The bolt 41 is inserted through the holes 23 of the bracket members 21 and 22 and the central hole of the base 11 and the nut 44 is screwed down on the bolt. The bushing 45 and the spool 30 are slipped onto the projecting end of the bolt. The case 12 is slipped on over the spool 30 and secured to the base 11 by a slight turn to bring the interlocking portion 15 of the case 12 and base 11 into engagement. The rim 14 of the case 12 is adapted to engage the annular shoulder 34 of the spool 30 so as to hold the spool on the shaft provided by the bolt 41 and bushing 45. The rim 14 also surrounds, but is preferably slightly spaced from, the bearing surface 35 so as to provide a secondary bearing for the outer end of the spool.

In use, the reel is held in the hand, as illustrated in Fig. 1. The cup-shaped casing substantially encloses the spool so that the casing can be gripped between the fingers and the base of the thumb and held firmly without interfering with the moving parts. The bracket or clamp 20 assists in positioning the reel on the hand and permits the grip to be relaxed without dropping the reel. The line L is wound on the spool 30 and extends out through the opening 16 of the casing and the eye 55 of the finger stall 50. The latter not only serves as a guide but transmits to the forefinger the pull exerted when a fish bites on a hook carried by the line so that the bite can be felt. The wire 51 of the finger stall 50 is sufficiently springy that the inner convolutions 52 act as a spring to keep the finger stall snugly on the finger while accommodating itself to fingers of different length. Adjustment for different sizes of hands may also be made by engaging the hook 54 (Fig. 2) in different ones of the holes 26. The line is wound in by turning the spool 30 by means of the handle 36. When the line is running out, the spool 30 is braked by inserting the thumb through the hole 18 in the casing so as to engage either the line wound on the spool or the outer rim 33 of the spool. In either case, slight flexibility of the support provided by the shaft structure permits the flection of the outer end of the spool so as to bring the bearing surface 35 into engagement with the opposite side of the rim 14, thereby providing a smooth braking action. The fact that the lower part of the casing is entirely closed not only makes it more convenient to hold the reel but also provides a receptacle for catching any water that may drip from the line when the latter is wound in wet.

The eye 17 through which the line L extends is freely slidable in the elongated hole 16 of the casing. By tilting the reel so as to incline the slot 16 in one direction or the other, as indicated by dotted lines in Fig. 6, the user can cause the eye 17 to slide longitudinally of the slot 16 as the line is being wound in so as to obtain an even winding of the line on the reel.

The embodiment of the invention shown in Figs. 7 to 17 comprises a shell 60, an adjustable clamp 70, a rotatable spool 80, a central shaft structure 90 rotatably supporting the spool and a finger stall 100 carrying an eye through which the fishing line runs.

The shell 60 comprises a circular base portion 61 having a central hole 61a and a frusto-conical case 62 secured to the base 61, for example by means of an inturned rim 63 which is rolled over the peripheral edge of the base. The shell 60 is of a size and shape to be held convenient in the hand, as illustrated in Fig. 7. At its smaller outer end, the shell is open with an inturned peripheral rim 64. In the upper portion of the case 62, there is provided an opening 65 which extends almost the full length of the shell and is joined by a slot 66 to the open end defined by the rim 64. A slide 67 is slidable lengthwise along the forward edge of the opening 65 which is shown as being reinforced by a bar 68 that forms a guide for the slide 67. A notch 69 provided in the upper portion of the slide 67 is adapted to receive the line, as shown in Fig. 7 and explained below. The shell 60 is formed of any suitable material, such as aluminum or plastic.

The clamp 70 assists in holding the reel in the hand and comprises a flat portion 71 adapted to fit against the base portion of the shell and a hook-shaped portion 72. An elongated hole 73 is provided in the flat portion 71 for adjustably securing the clamp to the shell, as described below. The hook portion 72 has a resilient outer end portion 74 adapted resiliently to engage the back of the hand. The clamp 70 is conveniently made of sheet metal, for example aluminum.

The spool 80 comprises a hollow spindle portion 81 and inner and outer end flanges 82 and 83. At its inner end, the spool 80 has a bearing portion 84 of smaller inner diameter than the remainder of the central bore of the spool. At its outer end, the spool 80 is provided with an abutment 85 adapted to be engaged by a crank 86 having a rotatable handle 87 and pivotally secured to a bushing 88 by means of a pivot pin 89. The shoulder 85 is engaged by the crank to rotate the spool when the crank is turned in a clockwise direction as viewed in Fig. 13. The portion forming the shoulder is beveled in the opposite direction so that when the crank is turned backwards the spool does not turn with it. It is hence possible to rotate the spool only in the selected correct direction.

The central shaft structure 90 serves the dual purpose of securing the clamp member 70 and the finger stall 100 adjustably on the base of the shell 60 and providing a bearing for the rotating spool 80 and crank 86. It is shown as comprising a threaded bolt 91 having a carriage head 92 with a short square shank 93. The bolt 91 extends through an elongated hole provided in the base portion of the finger stall 100, as described below, the elongated hole 73 in the clamp 70 and the central hole in the base portion of the shell. A nut 94 on the outer end of the bolt 91 is screwed down against the outer end of a tubular bushing 95 that surrounds the bolt and extends from the base of the shell to the nut. A washer 96 is preferably disposed between the end of the bushing and the base of the shell and another washer 97 is shown between the base of the shell and the flat portion 71 of the clamp 70. The outside diameter of the bushing 95 corresponds to the inside diameter of the bearing 84 of the spool and the inside diameter of the bushing 88 that carries the crank 86. The outer diameter of the bushing 88 corresponds to the inner diameter of the axial bore in the spool 80 (other than the bearing 84). The bearing 84 and bushing 88 thus rotatably support the spool on the bushing 95.

The finger stall 100 is adapted to fit on the forefinger when the reel is held in the hand, as shown in Figs. 7 and 8. It comprises a tapered finger-engaging portion 101 having a longitudinal split 102. The finger-engaging portion 101 is of oval cross section as shown in Fig. 12 to fit the shape of the finger. A base portion 103 is provided with an elongated hole 104 through which the bolt 91 extends to secure the finger stall 100 to the shell 60, as described above. The finger stall 100 is formed of thin, resilient material, for example sheet metal, so that the finger-engaging portion 101 can, by reason of the split 102 and the resilience of the material, accommodate itself to the size and shape of the finger. The resilient base portion 103 provides a resilient connection to the shell 60 so as to permit flexing of the finger stall 100 relative to the shell. At its outer end, the finger stall 100 carries a guiding eye 105 having a slot 106 that slopes upwardly and toward the finger stall and is preferably inclined to the axis of the guide eye so that line can be inserted into, and removed from, the guide eye through the slot 106 but will not come out accidentally. The eye 105 is supported on the finger stall by a shank portion 107 which projects outwardly from a base portion 108 which is inserted through a hole 109 and received in a channel 110 formed in the finger stall to provide convenient means for mounting the guide eye on the finger stall. As will be seen in Fig. 12, the finger stall 100 is on the opposite side of the base 61 from the spool 80. The shank 107 carrying the guide eye 105 projects laterally from the tip portion of the finger stall so that the guide eye is disposed in front of the spool 80 in position to receive a line L wound on the spool and coming out through the opening 65 in the shell.

The parts of the reel, as shown in Fig. 9, are readily assembled by inserting the bolt 91 through the elongated slot 104 of the finger stall 100, the slot 73 of the clamp 70, washer 97, the central hole in the base portion 61 of the casing 60, the washer 96 and the bushing 95. The spool 80 is then slipped on over the bushing 95 and the bushing 88 to which the crank 86 is pivotally connected is slipped over the outer end of the bushing 95 and into the bore of the spool 80. The nut 94 is then screwed onto the threaded outer end of the bolt 91 and tightened down against the outer end of the bushing 95, thereby clamping the clamp 70 and finger stall 100 to the base of the shell and, at the same time, rigidly supporting the bushing 95 coaxially of the shell.

In use, the reel is held in the hand, as shown in Figs. 7 and 8, with the forefinger received in the finger stall 100 and the frusto-conical shell 60 held between the other fingers and the base portion of the thumb. The resilient clamp 70 extends under the hand and the outer end portion 74 engages the back of the hand, cooperating with the finger stall 100 to hold the reel on the hand without physical exertion. A line L wound on the spool 80 extends out through the opening 65 in the shell and through the guide eye 105 on the tip of the finger stall 100. The line can be wound on the spool by turning the crank 86 in the direction of the arrow, as shown in Fig. 7. The crank engages the shoulder 85 and thereby rotates the spool. While being wound up, the line L is preferably held by the thumb in the notch 69 of the slide 67. By slowly moving the slide 67 back and forth along the guide bar 68, it is possible to wind the line uniformly on the spool. Moreover, the tension on the line can be maintained and controlled by the pressure of the thumb on the line in the notch 69.

When the line L is being played out from the spool 80, the rotation of the spool as the line unwinds can be controlled by inserting the thumb through the opening 65 in the shell and exerting pressure either on the line wound on the spool or on one or another of the flanges 82, 83. As illustrated in Fig. 15, the crank 86 can be swung to a position in which it does not engage the shoulder 85 on the spool and the spool is hence permitted to rotate freely. If it is desired to have the line "spin off" the spool without rotation of the latter, the line is taken out of the eye 105 through the slot 106 and is also taken out of the opening 65 in the shell through the slot 66 (Fig. 8). The crank 86 is then swung up into line with the bolt 91 and the spool 80 is slid outwardly on the bushing 95 to the position shown in Figs. 8 and 14. The reel is held in position so that the end of the spool points in the direction in which it is desired to cast the line so that the line can spin off the end of the spool as illustrated in Fig. 8. This facilitates casting since the spool does not rotate and hence the drag resulting from the momentum and friction of the spool is eliminated. To wind up the line after it has been cast in this manner, the user merely slips the spool back into the shell, brings the line through the slot 66 and inserts it into the eye 105 through the slot 106.

The reel is readily adjusted to fit all sizes of hands. The elongated slots 73 and 104 permit the adjustment of the clamp 70 and finger stall 100 when the nut 94 is loosened slightly. At the same time, the engagement of the edges of these slots with the square shank portion 93 of the bolt keeps the finger stall 100 and clamp 70 in correct relationship at approximately right angles to one another. The central hole in the base 61 of the shell is round so that—with the nut 94 loosened—the shell can be rotated relative to the finger stall 100 and clamp 70 so that the opening 65 is in a suitable position for the thumb to be placed alternatively on the slide 67 (Figs. 7 and 17) when winding up the line and on the spool when it is desired to brake the upwinding of the line. When the parts are adjusted as desired, the nut 94 is tightened to hold them in their adjusted relationship.

While preferred embodiments of the invention have been shown by way of example in the drawings, it will be understood that the invention is not limited to those embodiments and modifications may be made within the scope of the appended claims.

What I claim and desire to secure by Letters Patent is:

1. A fishing reel comprising a substantially frustoconical casing having a base and frustoconical side walls, said casing being of a size to be held comfortably in the hand and grasped between the fingers and the base portion of the thumb, a shaft fixed to said base and projecting inwardly therefrom coaxially of said casing, a spool in said casing and rotatably supported on said shaft, handle means for rotating said spool, clamp means adapted to hook over the hand and adjustably secured to said base for movement radially of the base to adjust it to fit hands of different sizes, a finger stall projecting forwardly from the base and adapted to receive the forefinger of the user, means resiliently connecting said finger stall with said casing to hold the finger stall on the finger when the reel is held in the hand, and an eye projecting laterally from an outer end portion of said finger stall so as to be disposed in front of said casing in a position to receive a line wound on said spool, said casing having an opening to permit passage of said line from the spool to said eye, said finger stall and eye serving as a short fishing rod and permitting use of said reel without a conventional rod.

2. A fishing reel comprising a substantially frustoconical casing having a base and frustoconical side walls, said casing being of a size to be held comfortably in the hand and grasped between the fingers and the base portion of the thumb, a shaft fixed to said base and projecting inwardly therefrom coaxially of said casing, a spool in the casing and rotatably supported on said shaft, handle means for rotating said spool, a finger stall projecting forwardly from the base and adapted to receive the forefinger of the user, means resiliently connecting said finger stall with said casing to hold the finger stall on the finger when the reel is held in the hand, and an eye carried by the outer end of said finger stall and disposed in front of said casing in a position to receive a line wound on said spool, said casing having an opening to permit passage of said line from the spool to said eye, said finger stall and eye serving as a short fishing rod and permitting use of said reel without a conventional rod.

3. A fishing reel comprising a substantially frustoconical shell having a base at its larger end and an opening at its smaller end, said base having a central hole, said shell being of a size and shape to be held comfortably in the hand with the base lying against the palm and the shell grasped between the finger and the heel of the thumb, a resilient clamp having a flat portion overlying said base and a hook portion adapted to engage the back of the hand, said flat portion having an elongated hole extending toward and away from said hook portion, a bolt having a head at one end and a threaded shank, said bolt extending through said holes in said clamp and base with the head end of the bolt bearing on said clamp and the threaded shank extending axially of said shell, a nut screwed onto the threaded shank of said bolt, said nut being tightened to fix said clamp in selected position on said base and to fix said bolt perpendicular to said base and axially of said shell, a tubular bushing on said bolt, a spool rotatably supported on said bushing, means for rotating said spool, a finger stall projecting forwardly from the base and adapted to receive the forefinger of the user, means resiliently connecting said finger stall with said shell to hold the finger stall on the finger when the reel is held in the hand, and an eye carried by an outer end portion of said finger stall and disposed in front of said casing in a position to receive a line wound on said spool, said casing having an opening to permit passage of said line from the spool to said eye, said finger stall and eye serving as a short fishing rod and permitting use of said reel without a conventional rod.

4. A fishing reel comprising a substantially frusto-conical shell open at its smaller end and provided at its larger end with a base having a central hole, said shell being of a size and shape to be held comfortably in the hand with the base lying against the palm and the shell grasped between the fingers and the heel of the thumb, a shaft fixed to said base and extending axially of said shell, a spool rotatable on said shaft, said spool having a bore with a diameter larger than said shaft and an abutment on the outer end of said spool, a bushing received in said bore and rotatable and slidable on said shaft, a crank pivotally mounted on said bushing, said crank being swingable from an inoperative position to an operative position in which it engages said abutment, said spool being movable axially on said shaft to a position in which the spool projects a substantial distance out of the open end of said shell, when the crank is in inoperative position and received in the bore of said spool, so that a line wound on the spool can spin off the end of the spool in a generally axial direction, a finger stall projecting forwardly from the base and adapted to receive the forefinger of the user, means resiliently connecting said finger stall with said shell to hold said finger stall on the finger when the reel is held in the hand, and an eye projecting laterally from an outer end portion of said finger stall so as to be disposed in front of said shell in a position to receive a line wound on said spool, said shell having an opening to permit passage of said line from the spool to said eye.

5. A fishing reel comprising a substantially frusto-conical shell open at its smaller end and having a base at its larger end, said shell being of a size and shape to be held comfortably in the hand with the base lying against the palm and the shell grasped between the fingers and the heel of the thumb, a shaft structure fixed to said base and extending axially of said shell, a spool rotatably mounted on said shaft structure, means at the outer end of said spool for rotating the spool, said spool being movable axially of said shaft structure from an inner position in which it is disposed substantially inside said shell to an outer position in which a substantial portion of said spool projects outwardly beyond the open smaller end of said shell, a finger stall projecting forwardly from the base and adapted to receive the forefinger of the user, means resiliently connecting said finger stall with said shell to hold the finger stall on the finger when the reel is held in the hand, and an eye projecting laterally from an outer end portion of said finger stall so as to be disposed in front of said casing in a position to receive a line wound on said spool, said casing having an opening to permit passage of said line from the spool to said eye and a slot connecting said opening with the open end of said shell permitting said line to be taken out through said slot and to spin off the spool in a generally axial direction when the spool is in its outer position.

6. A fishing reel comprising a substantially frusto-conical shell having a base and frusto-conical side walls, said shell being of a size and shape to be held comfortably in the hand with the base lying against the palm and the shell grasped between the fingers and the heel of the thumb, a shaft structure projecting from said base and disposed axially of said shell, a spool rotatably supported on said shaft, a finger stall extending forwardly from the base and adapted to receive the forefinger of the user, means adjustably connecting said finger stall with said shell to hold the finger stall on the finger when the reel is held in the hand, means for releasably securing said finger stall in adjusted position relative to said base to fit hands of different sizes, and an eye carried by an outer end portion of said finger stall and disposed in front of said shell having an opening to permit passage of said line from the spool to said eye.

7. A fishing reel according to claim 6, in which said finger stall is split in a longitudinal direction and is formed of resilient material to accommodate itself to fingers of different size.

8. A fishing reel comprising a tapered shell open at its smaller end and having a base at its larger end, said base having a central hole, said shell being of a size and shape to be held comfortably in the hand with the base lying against the palm and the shell grasped between the fingers and the heel of the thumb, a resilient clamp having a flat portion overlying said base and a hook portion adapted to engage the hand, said flat portion having an elongated hole extending toward and away from said hook portion, a finger stall extending forwardly from said base and having a flat portion overlying said base, said flat portion having an elongated hole extending lengthwise of said finger stall, a bolt having a head at one end and a threaded shank, said bolt extending through said holes in said finger stall, clamp and base, and the threaded shank extending axially of said shell, a tubular bushing surrounding said shaft, a nut screwed onto the threaded shank of said bolt, said nut being tightened against said bushing to grip said base and adjacent portions of said clamp and finger stall between said bushing and the head of the bolt to fix said clamp and finger stall in adjusted position relative to the base and fix said bolt and bushing perpendicular to said base and axial of said shell, a spool rotatably supported on said bushing, means for rotating said spool, and a guide eye carried by an outer end portion of said finger stall and disposed in front of said shell in a position to receive a line wound on said spool, said shell having an opening to permit passage of said line from the spool to said eye.

9. A fishing reel according to claim 8, in which said bolt is provided, adjacent its head, with a square portion which non-rotatably engages the edges of said elongated slots in said clamp and finger stall, thereby holding said clamp and finger stall in substantially fixed angular relation relative to one another while permitting their adjustment relative to said base.

10. A fishing reel according to claim 8, in which the hole in said base is round to permit rotary adjustment of said shell relative to said finger stall and clamp.

11. A fishing reel comprising a substantially frusto-conical shell open at its smaller end and having a base at its larger end, said shell being of a size and shape to be held comfortably in the hand with the base lying against the palm and the shell grasped between the fingers and the heel of the thumb, a spool rotatably mounted in the shell approximately coaxial therewith, means for rotating said spool, a finger stall extending forwardly from the base and adapted to receive the forefinger of the user, means adjustably connecting said finger stall with said shell to hold the finger stall on the finger when the reel is held in the hand, an eye carried by an outer end portion of said finger stall and disposed in front of said casing in a position to receive a line wound on said spool, said casing having an opening to permit passage of said line from the spool to said eye, said opening having a forward edge extending approximately the length of said spool, and a slide slidable back and forth along said edge, said slide having means for receiving and guiding a line and being in a position to be engaged by the thumb of the user when the reel is held in the hand so as to be moved back and forth while a line is being wound on said spool.

12. A fishing reel according to claim 11, in which said guide means is provided in its upper surface with a notch to receive said line, the line being held in said notch by the user's thumb with adjustable pressure to control the tension on the line as it is being wound onto the spool.

References Cited in the file of this patent

UNITED STATES PATENTS

| Number | Name | Date |
| --- | --- | --- |
| 938,948 | Austin | Nov. 2, 1909 |
| 1,485,663 | Best | Mar. 4, 1924 |
| 1,526,134 | Gilmore | Feb. 10, 1928 |
| 1,797,774 | Holden | Mar. 24, 1931 |
| 2,155,753 | Cook | Apr. 25, 1939 |